(12) United States Patent
Ishino

(10) Patent No.: US 9,512,305 B2
(45) Date of Patent: Dec. 6, 2016

(54) RUBBER COMPOSITION FOR TIRES, AND PNEUMATIC TIRE

(71) Applicant: SUMITOMO RUBBER INDUSTRIES, LTD., Kobe-shi, Hyogo (JP)

(72) Inventor: Soh Ishino, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 230 days.

(21) Appl. No.: 14/082,848

(22) Filed: Nov. 18, 2013

(65) Prior Publication Data

US 2014/0155539 A1  Jun. 5, 2014

(30) Foreign Application Priority Data

Dec. 4, 2012 (JP) ................. 2012-265503

(51) Int. Cl.
*C08L 9/00* (2006.01)
*B60C 1/00* (2006.01)

(52) U.S. Cl.
CPC . *C08L 9/00* (2013.01); *B60C 1/00* (2013.01); *Y02T 10/862* (2013.01)

(58) Field of Classification Search
CPC .......... B60C 1/00; C08L 9/00; Y02T 10/862
USPC ....................................... 524/492
See application file for complete search history.

(56) References Cited

U.S. PATENT DOCUMENTS

| | | | | |
|---|---|---|---|---|
| 5,919,875 A * | 7/1999 | Luo | ...................... | C08F 136/06 526/136 |
| 6,180,734 B1 * | 1/2001 | Luo | .............................. | 526/139 |
| 2006/0047056 A1 * | 3/2006 | Miyazaki | .................. | B60C 1/00 524/495 |
| 2010/0036019 A1 * | 2/2010 | Miyazaki | .............. | B60C 1/0016 523/157 |
| 2010/0056667 A1 * | 3/2010 | Hattori et al. | ................ | 523/157 |
| 2010/0071827 A1 | 3/2010 | Miyazaki | | |

FOREIGN PATENT DOCUMENTS

| | | |
|---|---|---|
| JP | 2010-95705 A | 4/2010 |
| JP | 2012-506931 A | 3/2012 |
| JP | 2013-136745 A | 7/2013 |

OTHER PUBLICATIONS

Ulrich, Can Bridgestone's Airless Tire End the Inner Tube Era? pp. 1-2, Popular Science, Jul. 26, 2012, obtained online from: http://www.popsci.com/technology/article/2012-07/can-bridgestone%E2%80%99s-airless-tire-end-inner-tube-era.*

* cited by examiner

*Primary Examiner* — Alexander Kollias
(74) *Attorney, Agent, or Firm* — Birch, Stewart, Kolasch & Birch, LLP

(57) ABSTRACT

The invention provides a rubber composition for tires, enabling a balanced improvement of processability, rubber strength, fuel economy, and crack growth resistance; and a pneumatic tire formed from the rubber composition. The invention relates to a rubber composition for tires, including: a butadiene rubber (a) having a cis content of 96% by mass or more, a Mooney viscosity of 35 to 75, and a ratio of (Weight average molecular weight (Mw))/(Number average molecular weight (Mn)) of 2.7 or less; and a butadiene rubber (b) containing 1,2-syndiotactic polybutadiene crystals with a melting point of 90 to 140° C., and having a weight average molecular weight of 50,000 to 500,000.

5 Claims, No Drawings

RUBBER COMPOSITION FOR TIRES, AND PNEUMATIC TIRE

TECHNICAL FIELD

The invention relates to a rubber composition for tires and a pneumatic tire formed from the rubber composition.

BACKGROUND ART

A reduction in carbon dioxide emissions has been recently more required to save resources and energy and to protect the environment. Accordingly, various ways for reducing carbon dioxide emissions of automobiles, such as weight saving and utilization of electric energy, have also been studied. To achieve these aims, tires for automobiles are required to have reduced rolling resistance so as to enhance fuel economy. Also, it is desired that tires have improved properties such as higher rubber strength.

Known methods for reducing rolling resistance include, for example, use of a silica formulation, reduction of the amount of filler, and use of filler with a little reinforcement. These methods, however, tend to reduce the strength of the rubber composition and deteriorate various properties.

Patent Literature 1 discloses a composition containing a butadiene rubber that contains 1,2-syndiotactic polybutadiene crystals, a modified butadiene rubber, and silica, thereby improving fuel economy and the like. Notwithstanding there still remains room for improvement in improving processability, rubber strength, fuel economy, and crack growth resistance in a balanced manner.

CITATION LIST

Patent Literature

Patent Literature 1: JP 2010-095705 A

SUMMARY OF INVENTION

Technical Problem

The invention aims to solve the above problems and provide a rubber composition for tires, enabling a balanced improvement of processability, rubber strength, fuel economy, and crack growth resistance; and a pneumatic tire formed from the rubber composition.

Solution to Problem

The invention relates to a rubber composition for tires, including: a butadiene rubber (a) having a cis content of 96% by mass or more, a Mooney viscosity of 35 to 75, and a ratio of (Weight average molecular weight (Mw))/(Number average molecular weight (Mn)) of 2.7 or less; and a butadiene rubber (b) containing 1,2-syndiotactic polybutadiene crystals with a melting point of 90 to 140° C., and having a weight average molecular weight of 50,000 to 500,000.

The butadiene rubber (a) is preferably synthesized in the presence of a rare earth catalyst.

An amount of the butadiene rubber (a) is preferably 10 to 80% by mass based on 100% by mass of a rubber component of the rubber composition.

An amount of the butadiene rubber (b) is preferably 1 to 50% by mass based on 100% by mass of a rubber component of the rubber composition.

The rubber composition for tires preferably includes at least one of carbon black and silica.

The invention also relates to a pneumatic tire, including a tire component formed from the rubber composition.

Advantageous Effects of Invention

The invention provides a rubber composition for tires, including: a butadiene rubber (a) having a cis content of 96% by mass or more, a Mooney viscosity of 35 to 75, and a ratio of (Weight average molecular weight (Mw))/(Number average molecular weight (Mn)) of 2.7 or less; and a butadiene rubber (b) containing 1,2-syndiotactic polybutadiene crystals with a melting point of 90 to 140° C., and having a weight average molecular weight of 50,000 to 500,000. Such a rubber composition enables a balanced improvement of processability, rubber strength, fuel economy, and crack growth resistance, and can provide a pneumatic tire excellent in rubber strength, fuel economy, and crack growth resistance.

DESCRIPTION OF EMBODIMENTS

The rubber composition for tires of the invention includes a butadiene rubber (a) having a cis content of 96% by mass or more, a Mooney viscosity of 35 to 75, and a ratio of (Weight average molecular weight (Mw))/(Number average molecular weight (Mn)) of 2.7 or less, and a butadiene rubber (b) containing 1,2-syndiotactic polybutadiene crystals with a melting point of 90 to 140° C., and having a weight average molecular weight of 50,000 to 500,000.

The studies of the present inventor have revealed that although the use of the butadiene rubber (b) improves processability and rubber strength, it may deteriorate fuel economy. On the other hand, although the use of the butadiene rubber (a) improves rubber strength, fuel economy, and crack growth resistance, it tends to deteriorate processability. In response to the newly emerged problem of the butadiene rubber (b), the invention uses the butadiene rubber (a) along with the butadiene rubber (b) as the rubber component to synergistically improve processability, rubber strength, fuel economy, and crack growth resistance compared to using only one of the butadiene rubbers (a) and (b). Consequently, favorable processability, rubber strength, fuel economy, and crack growth resistance can be obtained in a balanced manner.

The rubber component in the invention includes a butadiene rubber (a) (high cis BR) having a cis content of 96% by mass or more, a Mooney viscosity of 35 to 75, and a ratio of (Weight average molecular weight (Mw))/(Number average molecular weight (Mn)) of 2.7 or less.

The cis content of the butadiene rubber (a) is 96% by mass or more. The butadiene rubber (a) with a cis content of less than 96% by mass tends to fail to improve crack growth resistance.

Here, the cis content can be determined by infrared absorption spectrometry.

The butadiene rubber (a) has a Mooney viscosity at 100° C. (Mooney viscosity $ML_{1+4}$ (100° C.)) of 35 to 75, preferably 37 to 65, and more preferably 40 to 55. A Mooney viscosity in that range can lead to a balanced improvement of processability, rubber strength, fuel economy, and crack growth resistance.

Here, the Mooney viscosity is determined in conformity with ISO289 or JIS K6300.

The butadiene rubber (a) has a ratio of (Weight average molecular weight (Mw))/(Number average molecular weight (Mn)) of 2.7 or less, preferably 2.5 or less, and more preferably 2.3 or less. The lower limit of the ratio Mw/Mn is not particularly limited, and is preferably 1.9 or higher, and more preferably 2.0 or higher. A ratio of Mw/Mn in that range can lead to a balanced improvement of processability, rubber strength, fuel economy, and crack growth resistance.

Here, the weight average molecular weight (Mw) and number average molecular weight (Mn) are determined by gel permeation chromatography (GPC) (GPC-8000 series, produced by TOSOH CORPORATION, detector: differential refractometer, column: TSKGEL SUPERMULTIPORE HZ-M produced by TOSOH CORPORATION) relative to polystyrene standards.

The butadiene rubber (a) preferably has a vinyl content of 1.8% by mass or less, more preferably 1.0% by mass or less, still more preferably 0.5% by mass or less, and particularly preferably 0.3% by mass or less. A vinyl content of more than 1.8% by mass tends to lead to poor fuel economy. The lower limit of the vinyl content is not particularly limited.

Here, the vinyl content (the proportion of 1,2-butadiene units) can be determined by infrared absorption spectrometry.

The butadiene rubber (a) may be prepared by any method without particular limitations. If desired values are selected for the aforementioned parameters of the butadiene rubber (a), persons skilled in the art can easily prepare the butadiene rubber (a) with such parameters. In particular, the butadiene rubber (a) is preferably synthesized in the presence of a rare earth catalyst. This enables more favorable preparation of the butadiene rubber (a) with the parameters.

The rare earth catalyst may be a known one and examples thereof include catalysts containing a lanthanide rare earth element compound, an organic aluminum compound, an aluminoxane, or a halogen-containing compound, and optionally a Lewis base. Particularly preferred among these are Nd-based catalysts which contain a neodymium (Nd)-containing compound as the lanthanide rare earth element compound.

Examples of the lanthanide rare earth element compound include halides, carboxylate salts, alcoholates, thioalcoholates, or amides of rare earth metals with an atomic number of 57 to 71. In particular, Nd-based catalysts are preferred because they can produce BR with a high cis content and a low vinyl content.

Examples of the organic aluminum compound include compounds represented by $AlR^aR^bR^c$ (in which $R^a$, $R^b$, and $R^c$ are the same as or different from one another and each represent hydrogen or a C1 to C8 hydrocarbon group). Examples of the aluminoxane include acyclic aluminoxanes and cyclic aluminoxanes. Examples of the halogen-containing compound include aluminum halides represented by $AlX_kR^d_{3-k}$ (in which X represents a halogen, $R^d$ represents a C1 to C20 alkyl, aryl, or aralkyl group, and k represents 1, 1.5, 2, or 3); strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. A Lewis base may be used for complexation of the lanthanide rare earth element compound, and preferred examples thereof include acetylacetone, ketones, and alcohols.

The rare earth catalyst may be dissolved in an organic solvent (e.g. n-hexane, cyclohexane, n-heptane, toluene, xylene, benzene) prior to use in the polymerization of butadiene, or may be supported by an appropriate carrier such as silica, magnesia, or magnesium chloride before use. The polymerization may be carried out by either solution polymerization or bulk polymerization, at a polymerization temperature of preferably −30 to 150° C.; moreover, any polymerization pressure may be selected according to other conditions.

The butadiene rubber (a) may be a commercial product such as BR51, T700, and BR730 (all produced by JSR Corporation), and CB24 (produced by LANXESS).

The amount of the butadiene rubber (a), based on 100% by mass of the rubber component, is preferably 10% by mass or more, more preferably 20% by mass or more, and still more preferably 30% by mass or more. An amount of less than 10% by mass may fail to provide sufficient rubber strength, fuel economy, and crack growth resistance, and in particular sufficient crack growth resistance. The amount of the butadiene rubber (a) is preferably 80% by mass or less, more preferably 70% by mass or less, still more preferably 60% by mass or less, and particularly preferably 50% by mass or less. An amount of more than 80% by mass may cause insufficient processability, rubber strength, and fuel economy.

The rubber component in the invention includes, in addition to the butadiene rubber (a), a butadiene rubber (b) (SPB-containing BR) which contains 1,2-syndiotactic polybutadiene crystals (SPB) with a melting point of 90 to 140° C., and has a weight average molecular weight (Mw) of 50,000 to 500,000.

The 1,2-syndiotactic polybutadiene crystals have a melting point of 90° C. or higher, preferably 100° C. or higher, and more preferably 110° C. or higher. The melting point is 140° C. or lower, preferably 130° C. or lower. A SPB with a melting point in that range can lead to a balanced improvement of processability, rubber strength, fuel economy, and crack growth resistance.

The butadiene rubber (b) preferably contains 15% by mass or more, more preferably 20% by mass or more, of 1,2-syndiotactic polybutadiene crystals. The amount of 1,2-syndiotactic polybutadiene crystals is preferably 45% by mass or less, and more preferably 40% by mass or less. A SPB in an amount in that range can lead to a balanced improvement of processability, rubber strength, fuel economy, and crack growth resistance.

The weight average molecular weight (Mw) of the butadiene rubber (b) is 50,000 or more, preferably 70,000 or more, more preferably 100,000 or more, and still more preferably 150,000 or more. The Mw is 500,000 or less, preferably 400,000 or less, and more preferably 300,000 or less. The butadiene rubber (b) with a Mw in that range can lead to a balanced improvement of processability, rubber strength, fuel economy, and crack growth resistance.

The butadiene rubber (b) may be prepared by any method without particular limitations. If desired values are selected for the aforementioned parameters of the butadiene rubber (b), persons skilled in the art can easily prepare the butadiene rubber (b) with such parameters.

The butadiene rubber (b) may be a commercial product such as RB840, RB830, and RB820 (all produced by JSR Corporation).

The amount of the butadiene rubber (b), based on 100% by mass of the rubber component, is preferably 1% by mass or more, more preferably 5% by mass or more, and still more preferably 10% by mass or more. An amount of less than 1% by mass may fail to provide sufficient processability, rubber strength, and fuel economy. The amount of the butadiene rubber (b) is preferably 50% by mass or less, more preferably 40% by mass or less, still more preferably 30% by mass or less, and particularly preferably 20% by mass or less. An amount of more than 50% by mass may cause insufficient rubber strength and crack growth resistance.

The combined amount of the butadiene rubber (a) and the butadiene rubber (b), based on 100% by mass of the rubber component, is preferably 30 to 90% by mass, more preferably 40 to 80% by mass, and still more preferably 50 to 70% by mass. A combined amount of the butadiene rubber (a) and the butadiene rubber (b) in that range can lead to a balanced improvement of processability, rubber strength, fuel economy, and crack growth resistance.

The rubber component in the invention preferably includes an isoprene-based rubber in addition to the butadiene rubber (a) and the butadiene rubber (b).

Examples of the isoprene-based rubber include isoprene rubber (IR), natural rubber (NR), and modified natural rubbers. Examples of NR include deproteinized natural rubber (DPNR) and high purity natural rubber (HPNR). Examples of modified natural rubbers include epoxidized natural rubber (ENR), hydrogenated natural rubber (HNR), and grafted natural rubber. The NR may be one typically used in the tire industry, such as SIR20, RSS#3, and TSR20. Among these isoprene-based rubbers, NR is preferred in terms of achieving the effects of the invention more effectively.

The amount of the isoprene-based rubber, based on 100% by mass of the rubber component, is preferably 20% by mass or more, and more preferably 30% by mass or more. An amount of less than 20% by mass may fail to provide sufficient processability, rubber strength, fuel economy, and crack growth resistance. The amount of the isoprene-based rubber is preferably 70% by mass or less, more preferably 60% by mass or less, and still more preferably 50% by mass or less. An amount of more than 70% by mass may cause insufficient processability, rubber strength, fuel economy, and crack growth resistance.

The combined amount of the butadiene rubber (a), the butadiene rubber (b), and the isoprene-based rubber, based on 100% by mass of the rubber component, is preferably 50% by mass or more, more preferably 75% by mass or more, and still more preferably 90% by mass or more, and may be 100% by mass. A combined amount of the butadiene rubber (a), the butadiene rubber (b), and the isoprene-based rubber in that range can lead to a balanced improvement of processability, rubber strength, fuel economy, and crack growth resistance.

The rubber component in the invention may include a diene rubber such as styrene butadiene rubber (SBR), styrene isoprene butadiene rubber (SIBR), chloroprene rubber (CR), or acrylonitrile butadiene rubber (NBR), in addition to the butadiene rubber (a), the butadiene rubber (b), and the isoprene-based rubber.

The rubber composition of the invention preferably contains carbon black and/or silica, more preferably at least carbon black.

Using carbon black with the rubber component mentioned above enables further improvement of rubber strength and crack growth resistance. Examples of carbon black include SRF, GPF, FEF, HAF, ISAF, and SAF.

The carbon black preferably has a nitrogen adsorption specific surface area ($N_2SA$) of 50 $m^2/g$ or more, more preferably 90 $m^2/g$ or more, and still more preferably 120 $m^2/g$ or more. The carbon black with a $N_2SA$ of less than 50 $m^2/g$ may fail to provide sufficient reinforcement and therefore may lead to insufficient rubber strength and crack growth resistance. The $N_2SA$ is preferably 200 $m^2/g$ or less, and more preferably 160 $m^2/g$ or less. A $N_2SA$ of more than 200 $m^2/g$ tends to cause difficulty in dispersing the carbon black, leading to poor fuel economy and processability.

The $N_2SA$ of carbon black is determined in accordance with JIS K 6217-2:2001.

The carbon black preferably has a dibutyl phthalate (DBP) oil absorption of 50 ml/100 g or more, more preferably 100 ml/100 g or more. The carbon black with a DBP oil absorption of less than 50 ml/100 g may fail to provide sufficient reinforcement and therefore may lead to insufficient rubber strength and crack growth resistance. The DBP oil absorption of carbon black is preferably 200 ml/100 g or less, and more preferably 135 ml/100 g or less. A DBP oil absorption of more than 200 ml/100 g tends to cause difficulty in dispersing the carbon black, leading to poor fuel economy and processability.

The DBP oil absorption of carbon black is determined in accordance with JIS K6217-4:2001.

The amount of carbon black is preferably 3 parts by mass or more, more preferably 15 parts by mass or more, still more preferably 20 parts by mass or more, and particularly preferably 40 parts by mass or more, for each 100 parts by mass of the rubber component. An amount of less than 3 parts by mass may fail to provide sufficient reinforcement and therefore may lead to insufficient rubber strength and crack growth resistance. The amount of carbon black is preferably 100 parts by mass or less, and more preferably 70 parts by mass or less, for each 100 parts by mass of the rubber component. An amount of more than 100 parts by mass tends to generate more heat, leading to poor fuel economy. In such cases, processability also tends to be deteriorated.

Using silica with the rubber component mentioned above enables further improvement of fuel economy while achieving favorable rubber strength and crack growth resistance. This method is environmentally friendly, and can be a good preparation for the future when oil supplies are reduced. Examples of silica include dry silica (anhydrous silica) and wet silica (hydrous silica). Preferred among these is wet silica in terms of having many silanol groups.

The silica preferably has a nitrogen adsorption specific surface area ($N_2SA$) of 10 $m^2/g$ or more, more preferably 50 $m^2/g$ or more, still more preferably 100 $m^2/g$ or more, and particularly preferably 150 $m^2/g$ or more. The silica with a $N_2SA$ of less than 10 $m^2/g$ may fail to provide sufficient reinforcement and therefore may lead to insufficient rubber strength and crack growth resistance. The $N_2SA$ of silica is preferably 600 $m^2/g$ or less, more preferably 300 $m^2/g$ or less, still more preferably 260 $m^2/g$ or less, and particularly preferably 200 $m^2/g$ or less. A $N_2SA$ of more than 600 $m^2/g$ may cause difficulty in dispersing the silica, leading to poor processability. In such cases, fuel economy may also be reduced.

The $N_2SA$ of silica is determined by the BET method in conformity with ASTM D3037-81.

The amount of silica, for each 100 parts by mass of the rubber component, is preferably 3 parts by mass or more, more preferably 5 parts by mass or more, and still more preferably 10 parts by mass or more. An amount of less than 3 parts by mass may fail to achieve sufficient effects of silica. The amount of silica is preferably 50 parts by mass or less, more preferably 40 parts by mass or less, and still more preferably 30 parts by mass or less. The silica in an amount of more than 50 parts by mass may be difficult to disperse, and thus may deteriorate processability. In such cases, fuel economy may also be reduced.

The combined amount of carbon black and silica is preferably 5 to 150 parts by mass, more preferably 10 to 120 parts by mass, still more preferably 25 to 90 parts by mass, and particularly preferably 35 to 75 parts by mass, for each 100 parts by mass of the rubber component. A combined amount of carbon black and silica in that range can lead to a balanced improvement of processability, rubber strength, fuel economy, and crack growth resistance.

The rubber composition preferably contains a silane coupling agent along with the silica.

The silane coupling agent may be any conventional one used with silica in the rubber industry, and examples thereof include sulfide silane coupling agents such as bis(3-triethoxysilylpropyl)tetrasulfide, mercaptosilane coupling agents such as 3-mercaptopropyltrimethoxysilane, vinylsilane coupling agents such as vinyltriethoxysilane, aminosilane coupling agents such as 3-aminopropyltriethoxysilane, glycidoxysilane coupling agents such as γ-glycidoxypropyltriethoxysilane, nitro silane coupling agents such as 3-nitropropyltrimethoxysilane, and chlorosilane coupling agents such as 3-chloropropyltrimethoxysilane. Preferred among these are sulfide silane coupling agents, and more preferred is bis(3-triethoxysilylpropyl) tetrasulfide.

The amount of the silane coupling agent, for each 100 parts by mass of silica, is preferably 2 parts by mass or more, and more preferably 5 parts by mass or more. An amount of less than 2 parts by mass tends to fail to improve the dispersibility of silica, and thus tends to lead to a great decrease in durability. The amount of the silane coupling agent is preferably 15 parts by mass or less, and more preferably 10 parts by mass or less. An amount of more than 15 parts by mass tends to fail to produce an effect proportional to the increase in the cost.

The rubber composition of the invention may contain a softener. Examples of the softener include process oils, plant oils, and resins. Examples of the process oil include paraffinic process oils, naphthenic process oils, and aromatic process oils. Examples of the plant oil include castor oil, cottonseed oil, linseed oil, rapeseed oil, soybean oil, palm oil, coconut oil, peanut oil, rosin, pine oil, pine tar, tall oil, corn oil, rice bran oil, safflower oil, sesame oil, olive oil, sunflower oil, palm kernel oil, camellia oil, jojoba oil, macadamia nut oil, and tung oil. Examples of the resin include petroleum resins, coumarone-indene resins, and terpene resins. The total amount of the softener (particularly, the amount of the process oil) is preferably 1 to 30 parts by mass, more preferably 3 to 20 parts by mass, and still more preferably 3 to 10 parts by mass, for each 100 parts by mass of the rubber component.

The rubber compositions of the invention may optionally contain, in addition to the above ingredients, typical compounding agents used for producing a rubber composition, e.g., reinforcing fillers (e.g. clay), zinc oxide, stearic acid, various antioxidants, tackifiers, wax, vulcanizing agents such as sulfur, and vulcanization accelerators.

The rubber composition of the invention preferably contains a vulcanization accelerator. Examples of the vulcanization accelerator include sulfenamide, thiazole, thiuram, thiourea, guanidine, dithiocarbamic acid, aldehyde-amine, aldehyde-ammonia, imidazoline, and xanthate vulcanization accelerators. These vulcanization accelerators may be used alone, or two or more of these may be used in combination. Preferred among these are sulfenamide vulcanization accelerators in terms of achieving the effects of the invention more effectively.

Examples of the sulfenamide vulcanization accelerator include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). Preferred among these is CBS in terms of achieving the effects of the invention more effectively.

The amount of the vulcanization accelerator, for each 100 parts by mass of the rubber component, is preferably 0.7 parts by mass or more, and more preferably 1 part by mass or more. An amount of less than 0.7 parts by mass may fail to provide sufficient rubber strength. The amount thereof is preferably 5 parts by mass or less, and more preferably 3 parts by mass or less. An amount of more than 5 parts by mass may cause insufficient crack growth resistance.

The method for producing the rubber composition of the invention may be a known method such as a method including kneading the above ingredients in a rubber kneader such as an open roll mill and Banbury mixer and vulcanizing the kneaded mixture.

The rubber composition of the invention can be suitably used for various tire components, and in particular for sidewalls and base treads.

The pneumatic tire of the invention can be produced by a usual method using the rubber composition.

Specifically, a rubber composition including the above ingredients is, before vulcanization, extruded and processed into the shape of a tire component (particularly a sidewall or base tread), and then molded with other tire components in a tire building machine by a usual method to form an unvulcanized tire. The unvulcanized tire is heated and pressurized in a vulcanizer to produce a tire.

The pneumatic tire of the invention can be suitably used for various applications such as tires for passenger vehicles, trucks, buses, and heavy vehicles, and in particular it can be more suitably used as a tire for passenger vehicles.

EXAMPLES

Hereinafter, the invention will be described in details with reference to the examples which are not intended to limit the scope of the invention.

The following is the list of various chemicals used in the examples and comparative examples.

NR: TSR20

BR 1: JSR BR51 (high cis BR, a BR synthesized in the presence of Nd-based catalyst) (cis content: 96% by mass, Mooney viscosity (100° C.): 45, Mw/Mn: 2.20, vinyl content: 0.7% by mass (corresponding to the butadiene rubber (a))) produced by JSR Corporation BR 2: T700 (high cis BR, a BR synthesized in the presence of Nd-based catalyst) (cis content: 96% by mass, Mooney viscosity (100° C.): 42, Mw/Mn: 1.93, vinyl content: 0.6% by mass (corresponding to the butadiene rubber (a))) produced by JSR Corporation BR 3: BR730 (high cis BR, a BR synthesized in the presence of Nd-based catalyst) (cis content: 97% by mass, Mooney viscosity (100° C.): 55, Mw/Mn: 2.51, vinyl content: 0.9% by mass (corresponding to the butadiene rubber (a))) produced by JSR Corporation BR 4: CB24 (high cis BR, a BR synthesized in the presence of Nd-based catalyst) (cis content: 96% by mass, Mooney viscosity (100° C.): 44, Mw/Mn: 2.12, vinyl content: 0.7% by mass (corresponding to the butadiene rubber (a))) produced by LANXESS BR 5: UBEPOL BR150B (high cis BR, a BR synthesized in the presence of Ni-based catalyst) (cis content: 95% by mass, Mooney viscosity (100° C.): 40, Mw/Mn: 2.78, vinyl content: 2.0% by mass) produced by Ube Industries, Ltd.

BR 6: RB840 (SPB-containing BR) (melting point of SPB crystals: 126° C., amount of SPB crystals: 36% by mass, Mw: 200,000 (corresponding to the butadiene rubber (b))) produced by JSR Corporation BR 7: UBEPOL VCR617 (SPB-containing BR) (melting point of SPB crystals: 200° C., amount of SPB crystals: 17% by mass, Mw: 450,000) produced by Ube Industries, Ltd.

BR 8: RB810 (SPB-containing BR) (melting point of SPB crystals: 71° C., amount of SPB crystals: 18% by mass, Mw: 200,000) produced by JSR Corporation Silica: ULTRASIL VN3 ($N_2SA$: 175 $m^2/g$) produced by Evonik Degussa Silane coupling agent: Si69 (bis(3-triethoxysilylpropyl) tetrasulfide) produced by Evonik Degussa Carbon black: N550 ($N_2SA$: 143 $m^2/g$, DBP: 113 ml/100 g) produced by Cabot Japan K. K.

Oil: Process X-140 produced by Japan Energy Corporation

Antioxidant: Nocrac 6C (N-(1,3-dimethylbutyl)-N'-phenyl-p-phenylenediamine) produced by Ouchi Shinko Chemical Industrial Co., Ltd.

Stearic acid: "Tsubaki" produced by NOF Corporation

Zinc oxide: Zinc oxide #1 produced by Mitsui Mining & Smelting Co., Ltd.

Wax: Sunnoc N produced by Ouchi Shinko Chemical Industrial Co., Ltd.

Sulfur: Powdered sulfur produced by Tsurumi Chemical Industry Co., Ltd.

Vulcanization accelerator: Soxinol CZ (N-cyclohexyl-2-benzothiazolylsulfenamide) produced by Sumitomo Chemical Co., Ltd.

The chemicals in the amounts shown in the rows of Process 1 of Table 1 were charged in a 1.7-L Banbury mixer produced by Kobe Steel, Ltd., and kneaded for five minutes to have a discharge temperature of about 150° C., and the kneaded mixture was then discharged (Base kneading process).

To the kneaded mixture were added the sulfur and vulcanization accelerator in the amounts shown in the rows of Process 2 of Table 1, and the resulting mixture was kneaded in an open roll mill for about three minutes to have a discharge temperature of 80° C., thereby producing an unvulcanized rubber composition (Final kneading process).

The obtained unvulcanized rubber composition was press vulcanized at 170° C. for 20 minutes to prepare a vulcanized rubber composition.

The obtained unvulcanized rubber compositions and vulcanized rubber compositions were subjected to the following evaluations. Table 1 shows the results.

(Processability Index (Mooney Viscosity))

The Mooney viscosity at 130° C. of each unvulcanized rubber composition was determined in conformity with JIS K 6300. The results were expressed as indices (Mooney viscosity indices) relative to the Mooney viscosity ($ML_{1+4}$) of Comparative Example 1 (=100), based on the calculation formula below. A larger index means a lower Mooney viscosity and better processability.

(Mooney viscosity index)=($ML_{1+4}$ of Comparative Example 1)/($ML_{1+4}$ of each composition)×100

(Rubber Strength Index)

A tensile test was performed to determine the elongation at break in conformity with JIS K 6251:2010. The results were expressed as indices relative to that of Comparative Example 1 (=100). A larger index means better rubber strength (elongation at break).

(Rubber strength index)=(Elongation at break of each composition)/(Elongation at break of Comparative Example 1)×100

(Fuel Economy Index)

A test piece with a predetermined size was cut out from each vulcanized rubber composition. The loss tangent (tan δ) of the vulcanized rubber sheet was measured at an initial strain of 10%, a dynamic strain of 2%, a frequency of 10 Hz, and a temperature of 60° C. using a viscoelasticity spectrometer produced by Ueshima Seisakusho Co., Ltd. The results were expressed as indices (fuel economy indices) relative to the tan δ of Comparative Example 1 (=100), based on the calculation formula below. A larger index means better fuel economy.

(Fuel economy index)=(tan δ of Comparative Example 1)/(tan δ of each composition)×100

(Crack Growth Resistance Index)

A flex cracking test was performed on each vulcanized rubber composition in accordance with JIS K6260. In the test, the vulcanized rubber composition was repeatedly flexed for 500,000 times and then evaluated for cracks, and the results were expressed as indices relative to that of Comparative Example 1 (=100). A larger index means better crack growth resistance.

TABLE 1

| | | | Comparative Example | | | | | | Example | | | | | | |
|---|---|---|---|---|---|---|---|---|---|---|---|---|---|---|---|
| | | | 1 | 2 | 3 | 4 | 5 | 6 | 1 | 2 | 3 | 4 | 5 | 6 | 7 |
| Formulation (parts by mass) | Process 1 | NR | 40 | 40 | 40 | 40 | 40 | 40 | 40 | 40 | 40 | 40 | 40 | 40 | 40 |
| | | BR 1 (high cis BR) BR51 | 60 | — | — | 10 | 50 | 60 | 55 | 50 | 45 | 50 | — | — | — |
| | | BR 2 (high cis BR) T700 | — | — | — | — | — | — | — | — | — | — | 45 | — | — |
| | | BR 3 (high cis BR) BR730 | — | — | — | — | — | — | — | — | — | — | — | 45 | — |
| | | BR 4 (high cis BR) CB24 | — | — | — | — | — | — | — | — | — | — | — | — | 45 |
| | | BR 5 (high cis BR) BR150B | — | 60 | 50 | — | — | — | — | — | — | — | — | — | — |
| | | BR 6 (SPB-containing BR) RB840 | — | — | 10 | — | — | — | 5 | 10 | 15 | 10 | 15 | 15 | 15 |
| | | BR 7 (SPB-containing BR) VCR617 | — | — | — | 50 | — | — | — | — | — | — | — | — | — |
| | | BR 8 (SPB-containing BR) RB810 | — | — | — | — | 10 | — | — | — | — | — | — | — | — |
| | | Silica | — | — | — | — | — | 20 | — | — | — | 20 | — | — | — |
| | | Silane coupling agent | — | — | — | — | — | 1.6 | — | — | — | 1.6 | — | — | — |
| | | Carbon black | 55 | 55 | 55 | 55 | 55 | 35 | 55 | 55 | 55 | 35 | 55 | 55 | 55 |
| | | Oil | 5 | 5 | 5 | 5 | 5 | 5 | 5 | 5 | 5 | 5 | 5 | 5 | 5 |
| | | Antioxidant | 2.5 | 2.5 | 2.5 | 2.5 | 2.5 | 2.5 | 2.5 | 2.5 | 2.5 | 2.5 | 2.5 | 2.5 | 2.5 |
| | | Stearic acid | 2 | 2 | 2 | 2 | 2 | 2 | 2 | 2 | 2 | 2 | 2 | 2 | 2 |
| | | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | | Wax | 1 | 1 | 1 | 1 | 1 | 1 | 1 | 1 | 1 | 1 | 1 | 1 | 1 |
| | Process 2 | Sulfur | 1.5 | 1.5 | 1.5 | 1.5 | 1.5 | 1.5 | 1.5 | 1.5 | 1.5 | 1.5 | 1.5 | 1.5 | 1.5 |
| | | Vulcanization accelerator | 2 | 2 | 2 | 2 | 2 | 2 | 2 | 2 | 2 | 2 | 2 | 2 | 2 |

TABLE 1-continued

|  |  | Comparative Example | | | | | | Example | | | | | | |
| --- | --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 | 7 |
| Evaluation | Processability index | 100 | 105 | 115 | 80 | 130 | 100 | 105 | 110 | 115 | 108 | 110 | 105 | 102 |
|  | Rubber strength index | 100 | 95 | 100 | 110 | 80 | 100 | 103 | 103 | 103 | 103 | 105 | 106 | 106 |
|  | Fuel economy index | 100 | 95 | 100 | 90 | 105 | 103 | 105 | 110 | 115 | 115 | 117 | 119 | 119 |
|  | Crack growth resistance index | 100 | 95 | 100 | 105 | 85 | 98 | 105 | 108 | 110 | 103 | 112 | 114 | 114 |

A balanced improvement of processability, rubber strength, fuel economy, and crack growth resistance was achieved in the examples which used a combination of a butadiene rubber (a) having a cis content of 96% by mass or more, a Mooney viscosity of 35 to 75, and a ratio of (Weight average molecular weight (Mw))/(Number average molecular weight (Mn)) of 2.7 or less, and a butadiene rubber (b) containing 1,2-syndiotactic polybutadiene crystals with a melting point of 90 to 140° C., and having a weight average molecular weight of 50,000 to 500,000.

The invention claimed is:

1. A pneumatic tire formed from a rubber composition having a rubber component comprising:
   a butadiene rubber (a) having
      a cis content of 96% by mass or more, a Mooney viscosity at 100° C. of 42 to 55, and
      a (weight average molecular weight (Mw))/(number average molecular weight (Mn)) ratio of 1.9 to 2.5;
   a butadiene rubber (b) containing 1,2-syndiotactic polybutadiene crystals with a melting point of 90 to 140° C., and having a weight average molecular weight of 70,000 to 300,000; and
   isoprene-based rubber,
   wherein
      the butadiene rubber (a) is present in an amount of 30 to 60% by mass based on 100% by mass of the rubber component,
      the butadiene rubber (b) is present in an amount of 5 to 20% by mass based on 100% by mass of the rubber component,
      the isoprene-based rubber is present in an amount of 30 to 60% by mass based on 100% by mass of the rubber component, and
      the butadiene rubber (b) contains 25 to 45% by mass of 1,2-syndiotactic polybutadiene crystals.

2. The pneumatic tire according to claim 1, wherein the butadiene rubber (a) is synthesized in the presence of a rare earth catalyst.

3. The pneumatic tire according to claim 1, wherein the rubber composition comprises at least one of carbon black or silica.

4. The pneumatic tire according to claim 1, wherein the butadiene rubber (a) has a (weight average molecular weight (Mw))/(number average molecular weight (Mn)) ratio of 1.9 to 2.3.

5. The pneumatic tire according to claim 1, wherein the butadiene rubber (b) contains 36 to 45% mass of 1,2-syndiotactic polybutadiene crystals.

* * * * *